Patented Aug. 28, 1928.

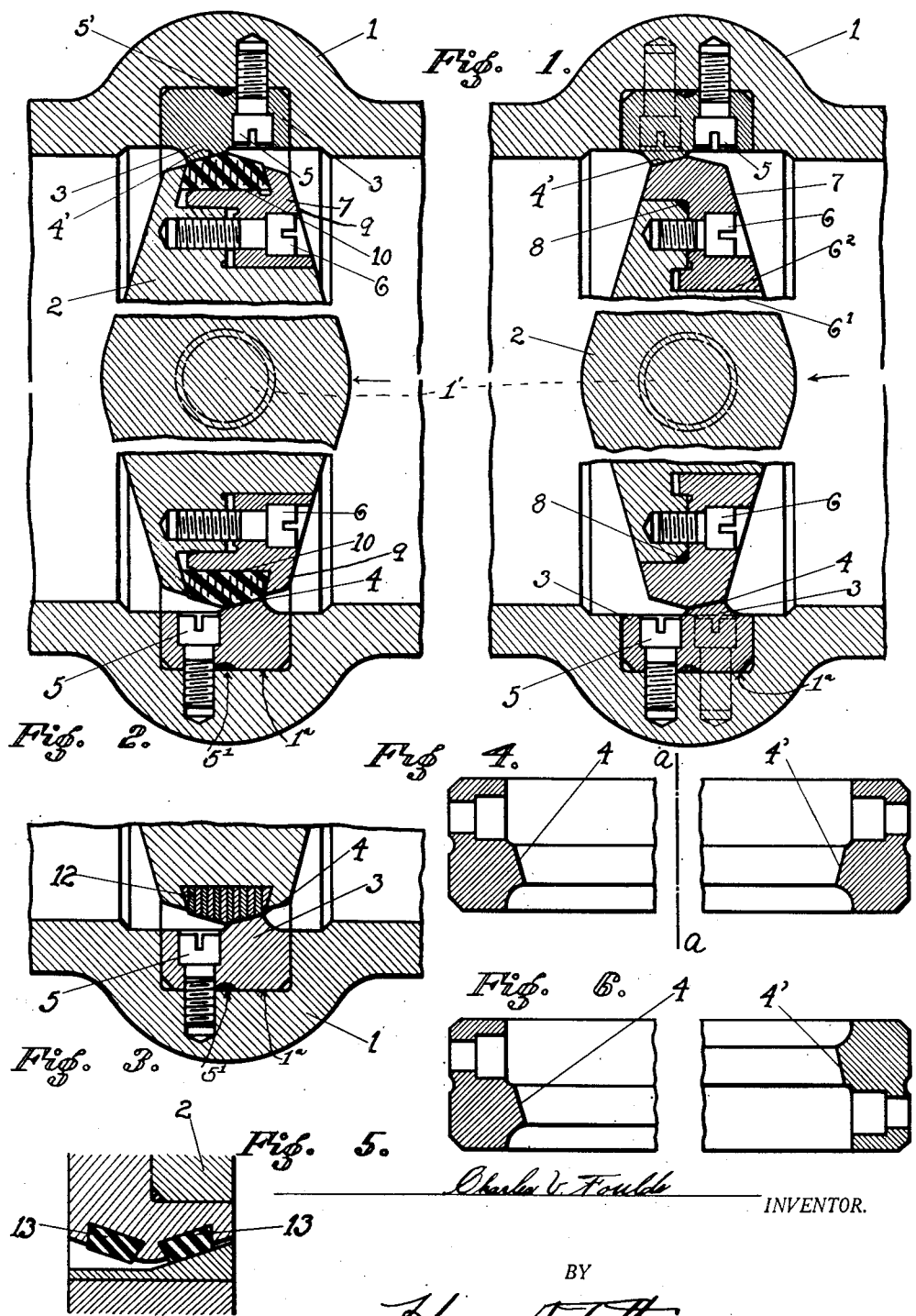
Aug. 28, 1928.
C. V. FOULDS
1,682,075
WATER TIGHT SEAT FOR BUTTERFLY VALVES
Filed Dec. 9, 1925

1,682,075

UNITED STATES PATENT OFFICE.

CHARLES V. FOULDS, OF BERKELEY, CALIFORNIA, ASSIGNOR TO THE PELTON WATER WHEEL CO., OF SAN FRANCISCO, CALIFORNIA, A CORPORATION OF CALIFORNIA.

WATER-TIGHT SEAT FOR BUTTERFLY VALVES.

Application filed December 9, 1925. Serial No. 74,255.

The present invention relates to improvements in butterfly valves, and more particularly to a valve seat, the method of manufacturing the same, and means for maintaining a tight contact between the valve periphery and seat, thus preventing or reducing to a minimum the leakage between the valve and seat when the valve is in closed position.

The invention has for one of its objects to reduce to a minimum the cost of wearing rings of butterfly valves by an improved method of manufacturing the same; to provide means for reducing to a minimum the leakage between the valve and seat when the valve is in closed position, thereby reducing the destructive wear on the edges of the valve and the surface of its seat. Another object is to provide means for compensating for such wear as may occur between the valve and seat thereby enabling the valve to be maintained tight over a long period of time, and eliminating or reducing to a minimum the necessity for frequent costly repairs or replacements.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To comprehend the invention reference is directed to the accompanying drawings wherein:—

Fig. 1 is a horizontal cross section of the preferred form of butterfly valve illustrating a metal to metal contact between the valve and seat.

Fig. 2 is a similar view illustrating an elastic packing ring associated with the valve periphery for cooperation with the seat.

Fig. 3 is a view in detail of the valve construction provided with a laminated elastic packing ring.

Fig. 4 is a view in cross section of the wearing ring or valve seat prior to being cut on lines a—a to form the valve seat.

Fig. 5 is a detail view illustrating separate annular elastic members carried on opposite bevelled faces of the valve ring periphery for contacting with the respective sides disposed at opposite sides of the valve fulcrum point.

Fig. 6 is a view in cross section of the wearing ring or valve seat illustrated in Fig. 4, after being cut on lines a—a and the parts reversed.

Referring to the drawings wherein like characters of reference designate corresponding parts, 1 indicates a valve body of cylindrical formation, and 2 a valve disk mounted therein on a shaft 1' to pivot in bearings, not shown, and carried at opposite points on the wall of the valve body 1. The inner wall of the body 1 is circumferentially grooved at 1ª, and within the groove are received circular wearing rings 3 provided with oppositely bevelled seats 4 and 4'. The wearing rings are constructed in the following manner:—

A ring, Fig. 4, of a diameter to snugly fit within the groove 1ª is preferably machined in its entirety in one piece, the seating face of the ring being conically tapered to produce, when cut on the line a—a, the valve periphery seats 4 and 4', Fig. 6. After machining, the ring is cut in halves on line a—a and the same are positioned within the groove 1ª, one half lying on either side of the shaft 1', and one half reversed by turning it through an arc of 180 degrees in respect to the other, thus positioning the conical portion of the ring in parallel relation on opposite sides of the shaft 1'. The cutting of the ring on the line a—a and the reversing of the cut halves, as above described, positions the conical seat 4' with face on the downstream side of the shaft center and the seat 4 with face on the upstream side of the shaft center, as clearly illustrated in Figs. 1 and 2. The rings are held in position by threaded studs 5 passing therethrough and engaging the base of the groove 1ª.

To preclude seepage between the outer periphery of the ring and the inner face of the groove 1ª, there is preferably positioned a gasket 5' in the groove in the outer periphery of the ring, held by the adjustment of the studs 5 against the inner surface of the groove 1ª.

In the construction shown in Fig. 1, adjustably carried by the valve disk 2 is a disk or wearing ring 7 held to the valve disk by studs 6. The periphery of the ring 7 is oppositely bevelled or tapered to seat against the seats 4 and 4' of the ring 3, and to preclude leakage between the valve disk and the wearing ring 7 is a packing 8 secured by the studs 6. The disk 2 is provided on one face with a center extension 6' receivable within an opening 6² in the center of the ring 7, the extension affording a guide for preventing the lateral movement of the ring relatively to the valve disk 2. In this construction, the rotating of the butterfly valve on its shaft causes a simultaneous seating of the opposite faces of the bevelled peripheral surface of the ring with the respective seats 4 and 4'.

In the construction illustrated in Fig. 2, the valve disk 2 and ring 7 are of the same diameter, have relatively adjustable cooperation, and are provided with flanges 9, the disk being further provided with a seat 10 lying between the flanges 9 when the parts are assembled, affording a support for receiving a resilient packing ring 11 formed with a lateral bevelled peripheral surface. One portion of this lateral bevelled peripheral surface wall, on the closing of the valve, bears against the downstream wearing seat 4', the other against the upstream wearing seat 4, thereby wedging onto its seat when the valve is closed. The valve ring 7 in the structure in Fig. 2 is adjustably held to the valve body by a plurality of studs 6, which when tightened compress the elastic ring 11, between the flanges 9 and expand the same peripherally to adjust for wear or possible reduction in diameter due to erosion.

Fig. 3 illustrates a construction wherein rubber or other resilient packing 12 of laminated structure is arranged in a peripheral groove in the valve disk 2 and is preferably permanently vulcanized in position therein, its surface being oppositely bevelled to ensure proper contact with the seats 4 and 4' on the movement of the valve to closed position.

Separate rings 13 may be positioned circumferentially of the oppositely bevelled faces of the disk ring 7, as in Fig. 5, and in this construction there is preferably provided a form of adjustment between the valve 2 and ring 7 similar to that shown in Figs. 1 and 2. The construction in Fig. 5 may be desirable in certain installations should it become necessary to construct resilient packings carried by the valve ring separate from each other instead of in one piece, as in Fig. 2.

It will be observed that the present structure illustrates a method of forming a valve seat whereby a single machined element when cut transversely and reversed affords corresponding seat portions for disposal at opposite sides of the butterfly mounting shaft.

I claim:—

1. In a butterfly valve structure, a body member, a disk pivotally mounted therein, a ring detachably carried by the periphery of the disk and provided on its own periphery with a pair of circumferential seats bevelled in opposite directions, and a seat ring removably positioned within the body, said seat ring consisting of duplicate portions extending one on each side of the valve axis in end to end relation, said portions provided with a disk ring seating face, the faces of the respective portions being disposed in parallel relation.

2. In a butterfly valve structure, a body member, a disk pivotally mounted therein, a ring detachably carried by said disk and provided on its periphery with an elastic packing formed with a pair of circumferential seats bevelled in opposite directions, and a seat ring removably positioned within the body, said seat ring consisting of duplicate portions, one extending on each side of the valve axis, said portions provided with a disk ring seating face, the faces of the respective portions being disposed in parallel relation.

3. In a butterfly valve structure, a body member, a valve disk pivotally mounted therein, a valve disk ring detachably carried by said disk and provided on its periphery with an elastic packing formed with a pair of circumferential seats bevelled in opposite directions, a seat ring removably positioned within the body, said seat ring consisting of duplicate portions, one extending on each side of the valve axis, said portions provided with a disk ring seating face, the faces of the respective portions being disposed in parallel relation, and means for adjusting said valve disk and valve disk ring relatively to each other to vary the compression on said elastic packing.

4. In a butterfly valve structure, a body member, a disk pivotally mounted therein and provided on one face with a lateral extension, a ring carried by and detachably secured to the disk and provided with a guide opening for the reception of said lateral extension, adusting screws for uniting said disk and ring, the periphery of said ring mounting a pair of circumferential oppositely bevelled seats, and a seat ring removably positioned within the body, said ring consisting of duplicate half portions extending one on each side of the valve axis, said portions each provided with a seating face bevelled in the same direction as the bevel of the ring adapted to engage therewith.

5. In a butterfly valve structure, a body member, a disk pivotally mounted therein and its periphery carrying a pair of seats disposed in parallel relation circumferentially thereof and bevelled toward opposite faces of the disk, a seat ring removably positioned within the body and consisting of duplicate portions extending one on each side of the valve axis in end to end relation, said portions each provided with a seating face, the faces of the respective portions being disposed in parallel relation.

In testimony whereof I have signed my name to this specification.

CHARLES V. FOULDS.